United States Patent [19]

James et al.

[11] Patent Number: 5,333,703

[45] Date of Patent: Aug. 2, 1994

[54] CARBON MONOXIDE SENSOR AND CONTROL FOR MOTOR VEHICLES

[75] Inventors: Robert C. James, Bonita Springs, Fla.; Dale M. Cherney, Howards Grove, Wis.

[73] Assignee: The Thames Group Ltd., Bonita Springs, Fla.

[21] Appl. No.: 1,641

[22] Filed: Jan. 7, 1993

[51] Int. Cl.$^5$ .................. B60K 28/10; B60K 28/00
[52] U.S. Cl. .................. 180/271; 454/75; 340/438
[58] Field of Search .................. 180/271, 272; 454/75; 340/425.1, 438, 632

[56] References Cited

U.S. PATENT DOCUMENTS

| | | | |
|---|---|---|---|
| 1,742,719 | 1/1930 | Nafziger | 180/271 |
| 3,418,914 | 12/1968 | Finkin | 454/75 |
| 3,786,462 | 1/1974 | Hayden | 340/438 |
| 3,789,231 | 1/1974 | Hayden | 340/632 |
| 4,160,373 | 7/1979 | Fastaia et al. | 73/23 |
| 4,354,571 | 10/1982 | Lakin et al. | 180/271 |
| 4,464,651 | 8/1984 | Duhame | 454/75 |
| 4,478,704 | 10/1984 | Miyoshi et al. | 204/412 |
| 4,778,113 | 10/1988 | Jewett et al. | 241/31 |
| 4,869,223 | 8/1989 | Grilk | 364/550 |
| 5,066,466 | 11/1991 | Holter et al. | 422/98 |
| 5,219,413 | 6/1993 | Lineberger | 180/272 |

FOREIGN PATENT DOCUMENTS

| | | | |
|---|---|---|---|
| 611204 | 12/1960 | Canada | 340/632 |
| 53-126645 | 11/1978 | Japan | 454/75 |
| 59-167312 | 9/1984 | Japan | 454/75 |

*Primary Examiner*—Karin L. Tyson
*Attorney, Agent, or Firm*—Senniger, Powers, Leavitt & Roedel

[57] ABSTRACT

A system for monitoring carbon monoxide (CO) levels produced by the operation of a vehicle's engine. The system includes a detector in the vehicle's passenger compartment for detecting the concentration of CO inside the compartment and circuitry for generating a HIGH CO signal when the detected concentration of CO inside the compartment is greater than a predetermined level. The system disables the operation of the engine in response to the HIGH CO signal. The system also senses a status condition of the vehicle and inhibits the disabling of the engine when the status condition is sensed.

50 Claims, 10 Drawing Sheets

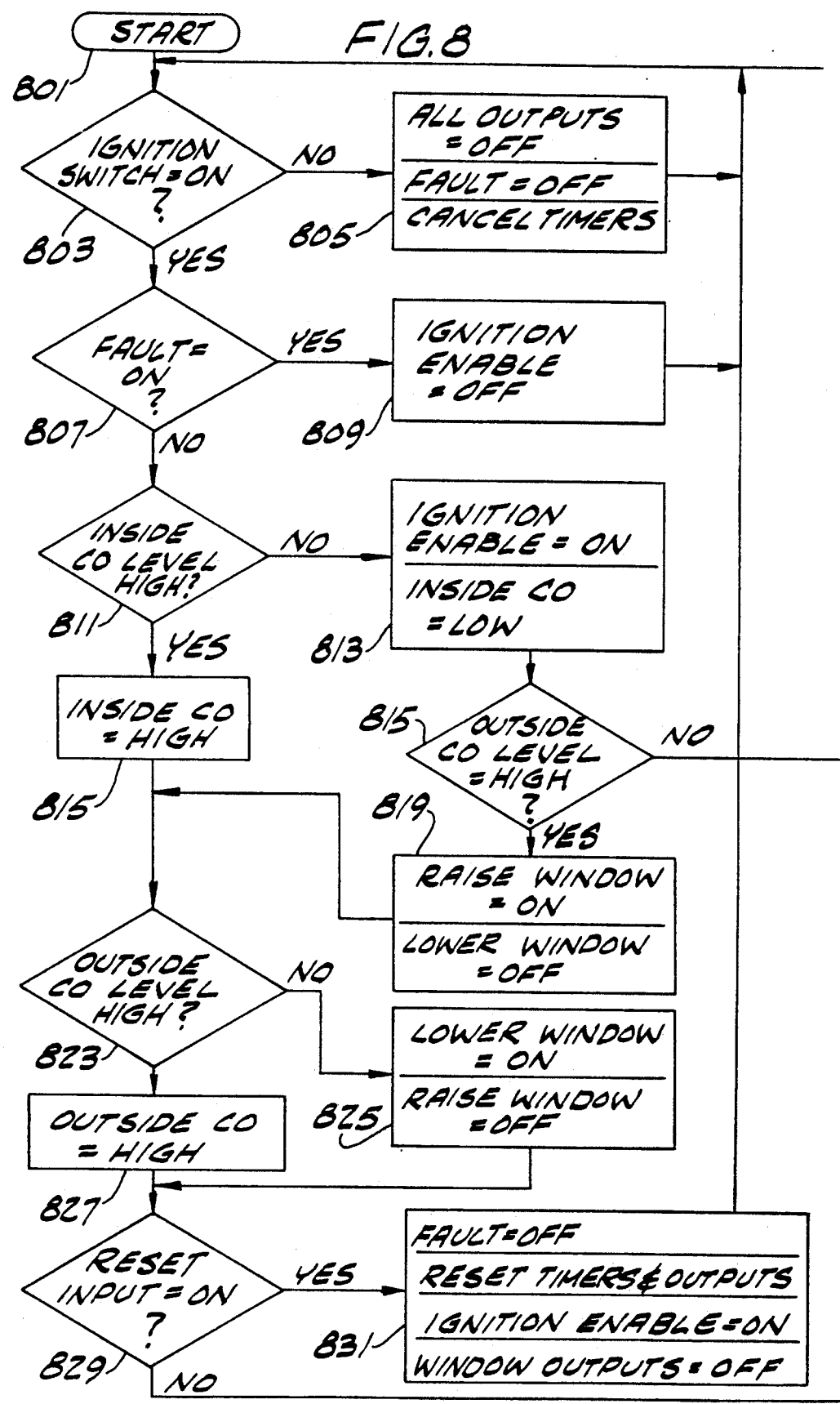

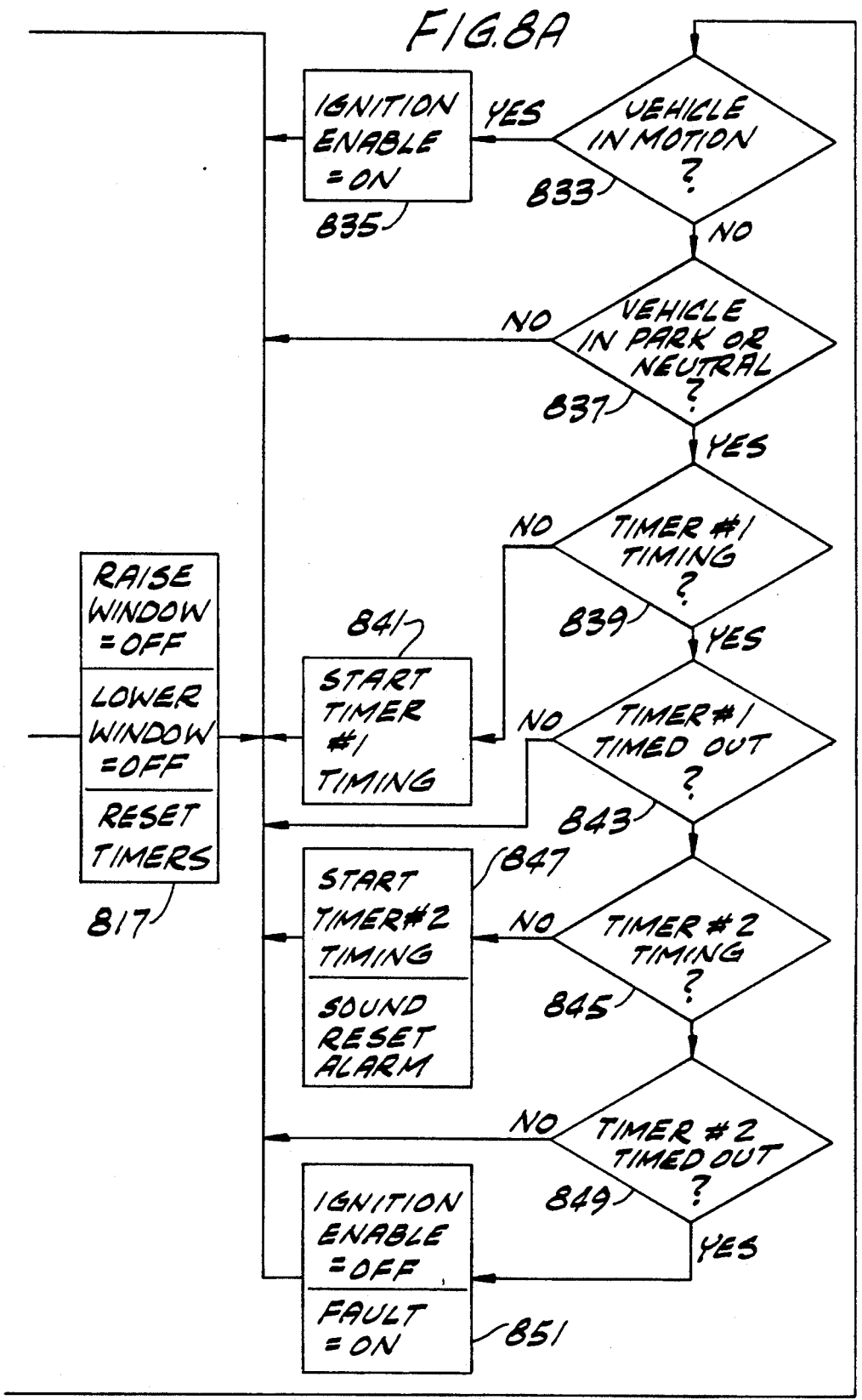

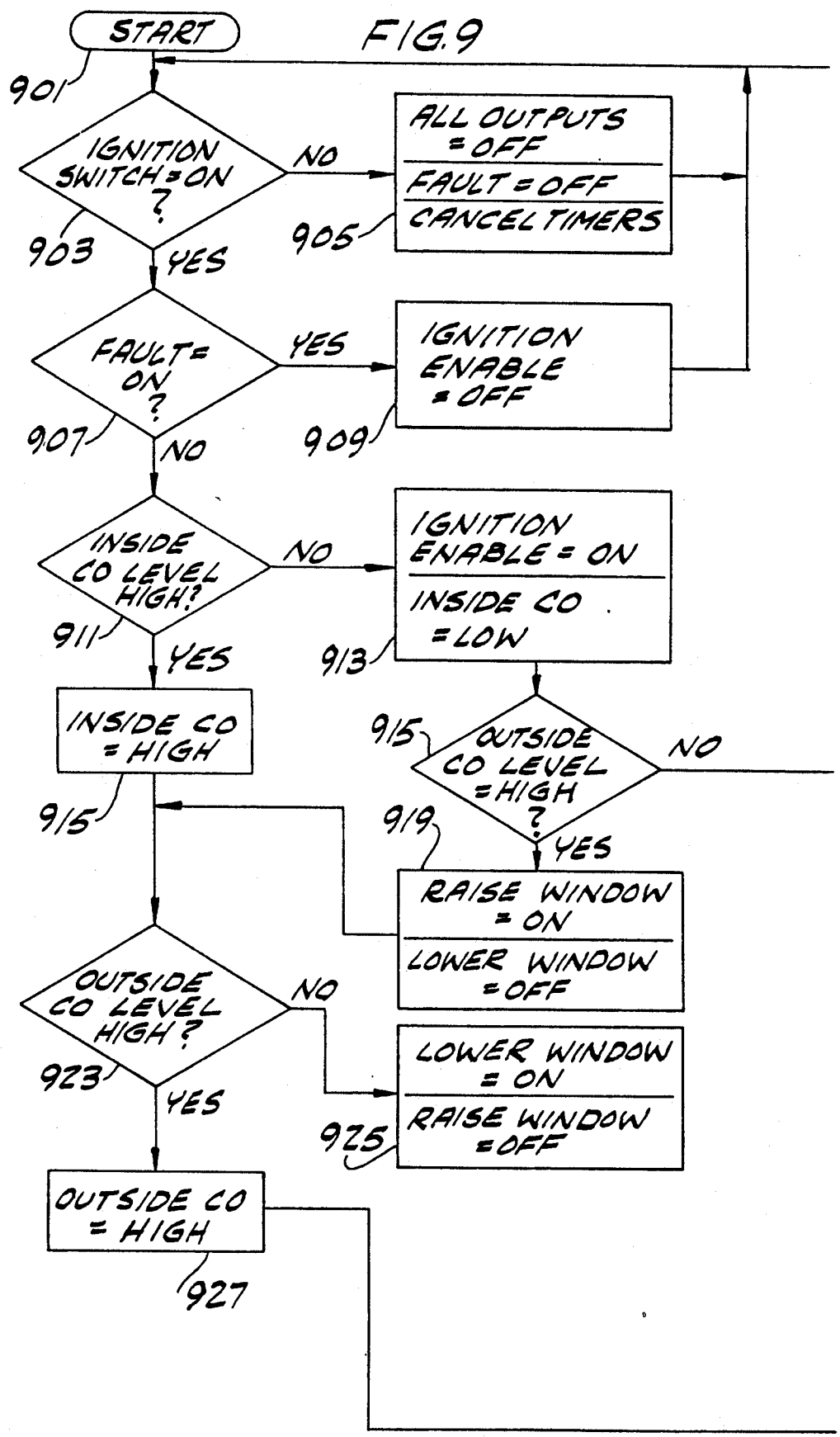

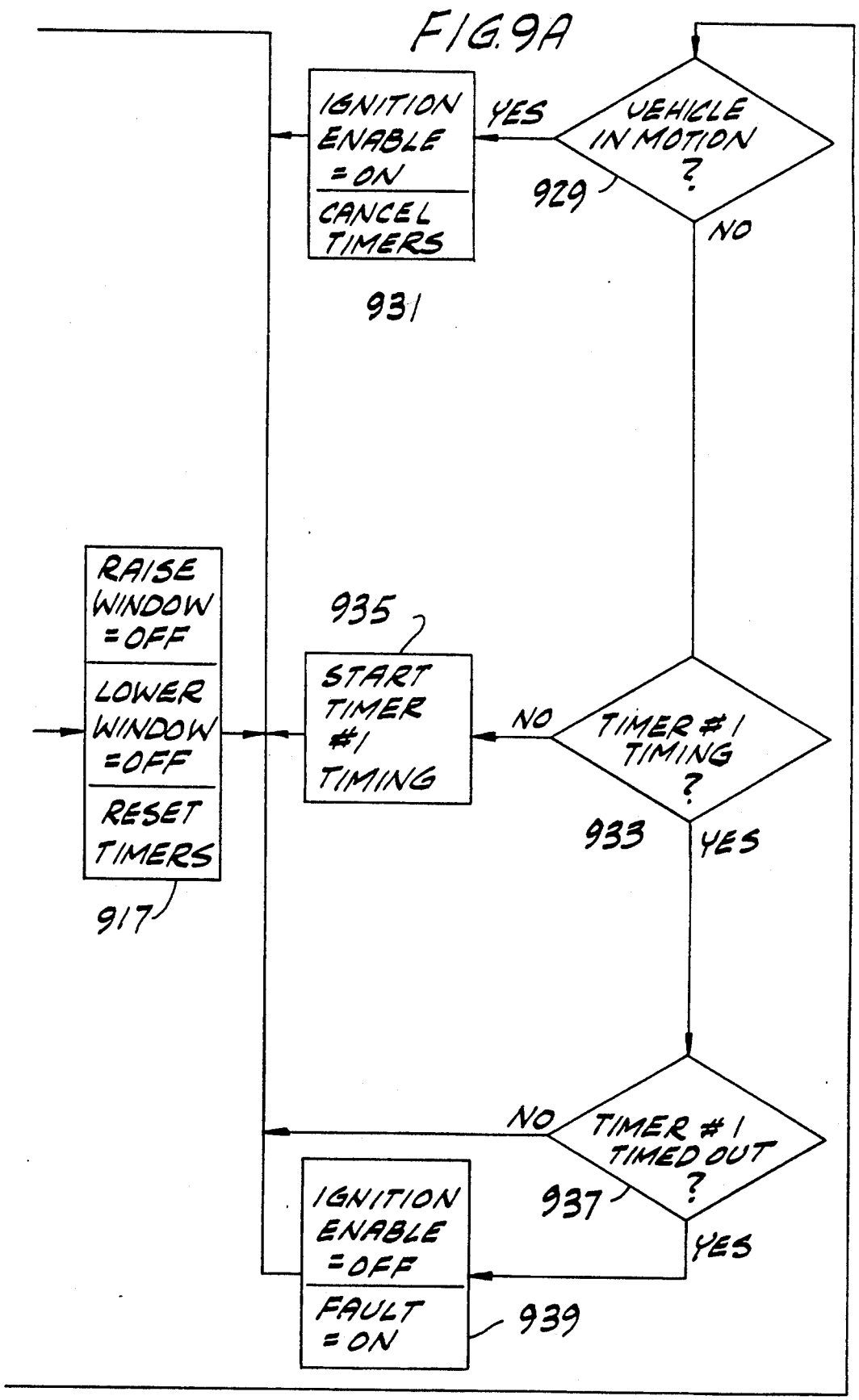

CARBON MONOXIDE SENSOR AND CONTROL FOR MOTOR VEHICLES

NOTICE

Copyright © 1992 The Thames Group Ltd. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention generally relates to systems for monitoring exhaust gases produced by a vehicle engine and, in particular, such a system disabling the engine when a hazardous concentration of carbon monoxide is detected either inside or outside the vehicle.

Engines, such as those in automobiles, produce exhaust gases containing carbon monoxide as a result of incomplete combustion of carbon-based fuels. As is well known, carbon monoxide is a very poisonous gas. The presence of carbon monoxide in one's bloodstream reduces the level of oxygen in the blood, which in turn, starves the brain of oxygen. The lethal effect of carbon monoxide poisoning has been known since ancient times. Unfortunately, carbon monoxide is particularly dangerous because it is both colorless, tasteless and odorless making detection of the gas by human senses difficult.

Numerous carbon monoxide poisonings occur each year. Carbon monoxide poisoning results from voluntary or involuntary inhalation of exhaust gases in various situations including suicide, leaving an automobile running in a closed garage, idling the engine while being stranded in heavy snow drifts, and operating an automobile having a faulty exhaust system which discharges exhaust into the passenger compartment. Carbon monoxide poisoning deprives the brain of oxygen which can cause slight to severe incapacitation and even death. For example, the National Center for Health Statistics reports that, in 1988, 2,247 people committed suicide and 372 people died accidentally from inhalation of motor vehicle exhaust gases. Further, statistics from the National Safety Council's "Accident Facts" reveal that an average of 400 accidental deaths and 2300 suicide deaths occurred each year from 1986 to 1989 because of carbon monoxide poisoning.

Many systems are presently available for monitoring levels of carbon monoxide. However, present systems fail to solve several problems associated with detecting hazardous concentrations of carbon monoxide produced by a vehicle.

Present carbon monoxide monitoring and detection systems inform the vehicle operator of potentially dangerous levels of carbon monoxide. These systems, however, do not alleviate the problem by disabling the source of the noxious gas. Therefore, the risk of carbon monoxide poisoning continues after detection of the hazardous condition.

Disabling the source of carbon monoxide upon detection of a hazardous concentration of the gas may often cause false disablements. Often, the concentration of carbon monoxide is hazardous at a specific but short time and the carbon monoxide quickly dissipates. In these situations, disabling the source is unnecessary to the safety of the vehicle's passengers and is a nuisance to the vehicle operator. Also, being able to move the vehicle after one is aware of hazardous carbon monoxide levels can facilitate the dissipation of the gas.

Disabling a vehicle's engine upon detection of a hazardous level of carbon monoxide is also dangerous. Most vehicles lose steering control, braking power and the like when their engines stop running. This creates the risk of the operator losing control of the vehicle. In any event, moving vehicles are less likely to contain hazardous concentrations of the gas than stationary vehicles. Therefore, it is desirable to have a carbon monoxide detection system which will not disable operation of the engine when the vehicle is in motion.

Presently available carbon monoxide systems also lack a detector for detecting the concentration of carbon monoxide outside the vehicle. Such a detector, located outside the vehicle's passenger compartment, can aid in the prevention of "garage" deaths. In other words, when a person leaves the engine running inside a closed space, such as a garage, tile concentration of carbon monoxide reaches hazardous levels in the space surrounding tile vehicle. Advantageously, the source of the poisonous gas should be disabled when either the passenger compartment contains a dangerous level of carbon monoxide or when the air surrounding the vehicle contains a dangerous level.

Depending on the levels of carbon monoxide inside and outside the vehicle, it is often desirable to open or close the vehicle's windows to facilitate the dissipation of the hazardous gas. In particular, if tile concentration of carbon monoxide is greater inside the compartment than outside, opening the windows allows the harmful gas to escape. If the concentration of carbon monoxide is greater outside the compartment than inside, closing the windows helps prevent the gas from entering the compartment.

SUMMARY OF THE INVENTION

Among the several objects of the present invention may be noted the provision of an improved carbon monoxide sensing system permitting monitoring exhaust gases produced by a vehicle engine; the provision of such system which detects the concentration of carbon monoxide inside a passenger compartment of the vehicle; the provision of such system which detects the concentration of carbon monoxide outside the passenger compartment; the provision of such system which compares the detected level of carbon monoxide to a predetermined level; the provision of such system which generates a signal representative of a hazardous concentration of carbon monoxide when the detected concentration is greater than tile predetermined level; the provision of such system which disables the engine when the detected concentration of carbon monoxide is at a hazardous level inside the passenger compartment; the provision of such system which disables the engine when the detected concentration of carbon monoxide is at a hazardous level outside the passenger compartment; the provision of such system which inhibits suicidal deaths from carbon monoxide poisoning; the provision of such system which inhibits accidental deaths from carbon monoxide poisoning; the provision of such system which responds to the duration of a signal representative of a hazardous concentration of carbon monoxide; the provision of such system which inhibits the disabling of the engine when tile hazardous concentration exists for less than a preset period; the provision of such system which permits the vehicle to be restarted and/or moved after detection of the hazardous condition; the provision of such system which inhibits the disabling of the engine when the vehicle is in motion; the provision of such system which automatically opens the windows when the concentration of carbon monoxide is greater inside the vehicle than outside; tile provision of such system which automatically closes the windows when the concentration of carbon monoxide is greater outside the vehicle than inside; the provision of such system which permits use of the system with both automatic and manual transmission vehicles; and the provision of such system which is economically feasible and commercially practical.

Briefly described, the system of the present invention monitors carbon monoxide (CO) levels produced by a vehicle. The operation of the vehicle's engine produces CO as a by-product. The system includes a detector in the vehicle's passenger compartment for detecting the concentration of CO inside the compartment and circuitry for generating a HIGH CO signal when the detected concentration of CO inside the compartment is greater than a predetermined level. The system disables the operation of the engine in response to the HIGH CO signal. The system also senses a status condition of the vehicle and inhibits the disabling of the engine when the status condition is sensed.

Alternatively, the system of the present invention monitors CO levels produced by a vehicle. The operation of the vehicle's engine produces CO as a by-product. The system includes a first detector outside the vehicle's passenger compartment for detecting the concentration of CO outside the compartment and circuitry for generating a first signal representative of the detected concentration of CO outside the compartment. The system disables the operation of the engine in response to the first signal when tile concentration of CO detected by the first CO detector is greater than a first predetermined level.

Alternatively, the system of the present invention monitors CO levels produced by a vehicle. The operation of the vehicle's engine produces CO as a by-product. The system includes a detector in the vehicle's passenger compartment for detecting the concentration of CO inside tile compartment and circuitry for generating a HIGH CO signal when the detected concentration of CO inside the vehicle is greater than a predetermined level. The system disables tile operation of the engine in response to the HIGH CO signal only when the detected concentration of CO is greater than the predetermined level for longer than a predetermined length of time.

Alternatively, the invention may comprise various other systems and methods.

Other objects and features will be in part apparent and in part pointed out hereinafter.

BRIEF DESCRIPTION OF THE DRAWINGS

FIG. 8 and 8A are a flow diagram of the operation of yet another preferred embodiment of tile invention.

FIG. 9 and 9A are a flow diagram of the operation of yet another preferred embodiment of the invention.

Corresponding reference characters indicate corresponding parts throughout the drawings.

DETAILED DESCRIPTION OF THE PREFERRED EMBODIMENTS

The present invention is directed to a system for monitoring levels of carbon monoxide (CO) produced by a vehicle. The vehicle has an engine which produces CO as a by-product of its operation.

Figure 1:
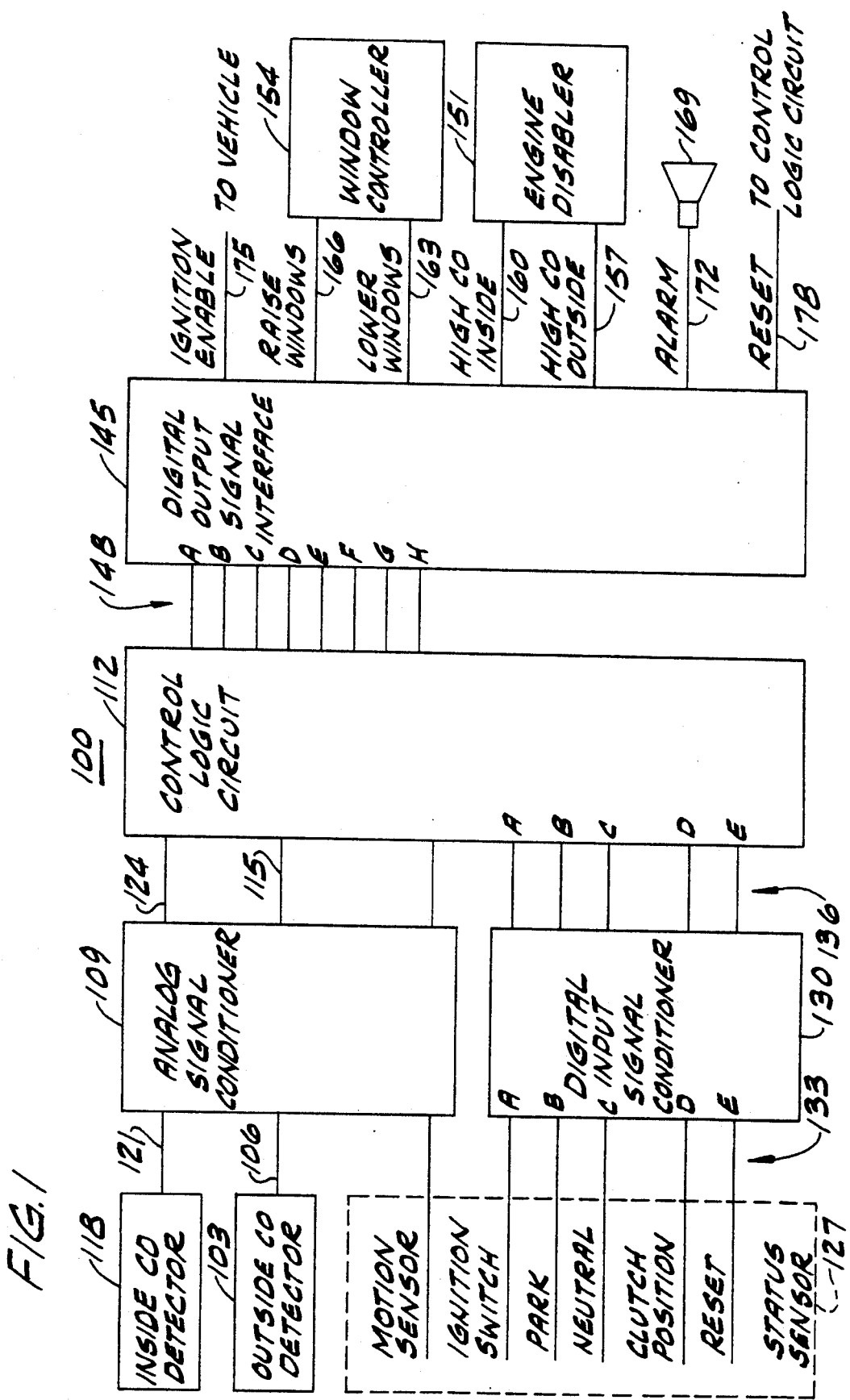
FIG. 1 is a block diagram of one preferred embodiment of a system for monitoring carbon monoxide according to the invention.

A system 100 embodying the invention is shown in block diagram form in FIG. 1. An outside CO detector 103 detects the concentration of CO outside a vehicle's passenger compartment and provides a signal via line 106 to an analog signal conditioner 109 (see FIG. 2). The voltage of this signal from the outside CO detector 103 is proportional to the concentration of CO present outside the compartment. The outside CO detector 103 is particularly advantageous for detecting concentrations of CO in a garage, or other structure, in which the vehicle is operating. Outside CO detector 103 inputs the signal to the analog signal conditioner 109 via line 106 which compares its magnitude to a first predetermined level. The first predetermined level corresponds to a concentration of CO which is hazardous to human health or otherwise undesirable.

The analog signal conditioner 109 inputs an OUTSIDE CO signal to a control logic circuit 112 (see FIGS. 4A and 4B) via line 115. If the concentration of CO detected by the outside CO detector 103 exceeds the first predetermined level, OUTSIDE CO is logic level high. If not, OUTSIDE CO is logic level low. Generally, a logic level high output signal via line 115 is referred to as a HIGH CO signal. In this manner, the analog signal conditioner 109 "conditions" tile signal for inputting to control logic circuit 112. The control logic circuit 112 may comprise discrete CMOS, TTL or logic gates of other families, Programmable Logic Arrays, Programmable Gate Arrays, microprocessor controllers or relays.

In a preferred embodiment, system 100 also includes an inside CO detector 118 located in the passenger compartment of the vehicle for detecting the concentration of CO in the compartment. Inside CO detector 118 provides a signal via line 121 to the analog signal conditioner 109 similar to the signal provided by outside CO detector 103. The voltage of the signal from the inside CO detector 118 is proportional to the concentration of CO present in the compartment. Inside CO detector 118 inputs the signal via line 121 to the analog signal conditioner 109 for comparing the voltage of the inside CO detector 118 signal to a second predetermined level. The second predetermined level also corresponds to a concentration of CO which is hazardous to human health or otherwise undesirable.

Analog signal conditioner 109 inputs an INSIDE CO signal to tile control logic circuit 112 via line 124. If the concentration of CO detected by inside CO detector 118 exceeds the second predetermined level, INSIDE CO is logic level high. If not, INSIDE CO is logic level low. Generally, a high output signal via line 124 is also referred to as a HIGH CO signal. Thus, either a logic level high OUTSIDE CO signal or a logic level high INSIDE CO signal may be referred to generically as a HIGH CO signal.

Advantageously, system 100 disables operation of the vehicle's engine in response to a HIGH CO signal to prevent tile detected concentration of CO from increasing after a hazardous level has been reached. However, disabling tile engine upon detection of a hazardous concentration of the gas may cause false disablements. Often, the concentration of CO is hazardous at a specific but short time and the CO quickly dissipates. In these situations, disabling the engine is unnecessary to the safety of the vehicle's passengers and is a nuisance to the vehicle operator. Also, being able to move the vehicle after becoming aware of hazardous CO levels can facilitate the dissipation of the gas.

Further, disabling the vehicle's engine upon detection of a hazardous level of CO is dangerous when the vehicle is in motion. Most vehicles lose steering control, braking power and the like when their engines stop running. This creates the risk of the operator losing control of the vehicle. In any event, moving vehicles are less likely to contain hazardous concentrations of CO than stationary vehicles.

FIG. 1 shows a status sensor 127 for sensing at least one status condition of the vehicle. The status sensor 127 comprises various sensors which input signals representing particular status conditions to a digital input signal conditioner 130 (see FIG. 3) via lines 133A-133E. The digital input signal conditioner isolates the battery supply voltage from the logic voltage of the control logic circuit 112 and outputs the status condition signals to the control logic circuit 112 via lines 136A-136E. Preferably, the status sensor 127 includes a motion sensor which detects whether the vehicle is moving. In one embodiment, a motion sensor signal may be input to the analog signal conditioner 109 via line 139 wherein the signal is conditioned before being input to the control logic circuit 112 via line 142. System 100 may inhibit the disabling of the engine in response to tile motion signal.

A number of means for sensing motion of the vehicle are available. Determining when an output shaft moves is indicative of vehicle motion. Also, a signal, such as a speedometer signal may be used to indicate vehicle motion. It is possible to use the tachometer from the electronic speedometer to generate the signal required to indicate motion.

In those situations when disabling the engine is not desired, such as when the vehicle is moving, system 100 advantageously inhibits tile disabling. The presence of the following status conditions, as sensed by the status sensor 127, may cause system 100 to inhibit the disabling of the vehicle's engine: the vehicle being in motion or, the position of the vehicle's gear shift lever in a position other than a PARK or a NEUTRAL position and/or the position of the vehicle's clutch in a NONDEPRESSED position. Status sensor 127 also senses the position of the vehicle's ignition switch and the position of a manual reset switch for resetting system 100. The status sensor 127 will be described in greater detail below.

In a preferred embodiment, system 100 only disables the engine when the detected concentration of CO is greater than at least one of tile predetermined levels for longer than a predetermined length of time. System 100 may include a timer for determining the length of time that the detected concentration of CO is excessive. System 100 then inhibits tile disabling of the engine when the detected concentration of CO is greater than at least one of the predetermined levels for shorter than the predetermined length of time. In order to reset the timing of tile predetermined length of time, the vehicle's ignition switch may be turned to its off position and then returned to its on position. A manual reset switch for generating a RESET signal provided via line 133E may also be used for resetting the timers.

As shown in FIG. 1, a digital output signal interface 145 (see FIG. 5) receives digital signals via lines 148A-148H from the control logic circuit 112. The output signal interface 145 isolates the control logic circuit 112 from a load, such as an engine disabler 151 or a window controller 154.

The control logic circuit 112 designates various logic level signals according to their function. For example, the signals designated OUTSIDE CO and INSIDE CO represent the detected concentrations of CO outside and inside the compartment, respectively, in comparison to the predetermined levels. If a high OUTSIDE CO signal is present at line 115, the output signal interface 145 outputs a HIGH CO OUTSIDE signal via line 157 to engine disabler 151; if a high INSIDE CO signal is present at line 124, the output signal interface 145 outputs a HIGH CO INSIDE signal via line 160 to engine disabler 151. The engine disabler 151 is responsive to the HIGH CO signal via line 157 and/or to the HIGH CO signal via line 160.

The engine disabler 151 may be embodied by a number of mechanisms, all of which are responsive to a HIGH CO signal indicating that the detected concentration of CO exceeds either or both of the predetermined levels. In a preferred embodiment, the vehicle includes an ignition system which enables the engine. The engine disabler 151 inhibits operation of the ignition system in response to a HIGH CO OUTSIDE signal or a HIGH CO INSIDE signal so that the ignition system will not enable the engine. Alternatively, the engine disabler 151 can inhibit operation of the vehicle's electric fuel pump or fuel injection system or close a valve disposed in the vehicle's fuel line thereby preventing the flow of fuel to the engine which would disable operation of the engine. The engine disabler 151 continually disables the engine until the ignition switch or the reset switch resets system 100.

Additional outputs from the output signal interface 145 control the vehicle's power windows in response to the detected CO concentrations inside the passenger compartment and outside the vehicle. Window controller 154 responds to signals from the output signal interface 145 to energize the vehicle's power windows. In turn, the power windows operate to open and close the windows. In this manner, system 100, through use of the window controller 154 and the vehicle's power window mechanism, opens the windows when the level of CO inside the compartment is greater than the level outside. Further, system 100 closes the windows when the level of CO outside the compartment is greater than the level of CO inside the compartment. In one preferred embodiment, window controller may be a switch in parallel with the operator controls for the windows, the switch being selectively opened or closed in response to the RAISE WINDOW signal 166 and LOWER WINDOW signal 163.

Signals designated LOWER WINDOW and RAISE WINDOW correspond to the detected concentrations of CO which are greater inside the passenger compartment or outside the vehicle, respectively. If the INSIDE CO signal is high but the OUTSIDE CO signal is low, then control logic circuit 112 generates the LOWER WINDOW signal. Window controller 154 responds to the LOWER WINDOW signal via 163 to energize the vehicle's power windows to open the windows. Conversely, if the INSIDE CO signal is low but the OUTSIDE CO signal is high, then control logic circuit 112 generates the RAISE WINDOW signal. Window controller 154 responds to the RAISE WINDOW signal via line 166 to energize the vehicle's power windows to close the windows. Further, the window controller 154 continually responds to the LOWER WINDOW and RAISE WINDOW signals for opening or closing the windows, respectively, until system 100 has been reset. System 100 resets when the ignition switch is returned to its off position or when the RESET signal is present.

In a preferred embodiment of the present invention, system 100 includes an audible alarm 169. The alarm 169 sounds a warning in response to an ALARM signal via line 172 when the detected concentration of CO exceeds one of the predetermined levels. In other words, the ALARM signal is a function of the detected concentration of CO and causes the audible warning to sound when either INSIDE CO or OUTSIDE CO is high. The alarm 169 informs the vehicle's passengers of hazardous conditions as well as the reason the vehicle's engine has been disabled. Alternatively, indicators of the actual level of CO in the cabin may be added to provide a visual indication of dangerous CO levels. A visual indicator may be embodied as a meter (not shown) driven by the CO detectors 103 or 118 to provide an analog indication of the detected level of CO. Alternatively, the analog signal can be converted to a digital indication. The audible or visual indicator may also be used to warn the vehicle's operator of hazardous conditions }when it is undesirable to disable the vehicle's engine, such as when the vehicle is in motion.

As mentioned above, the vehicle's ignition system includes an ignition switch. The ignition switch has an off position for disabling the vehicle and an on position for enabling the vehicle. When the ignition switch is off, system 100 is deactivated, and when the ignition switch is on, system 100 is reactivated. The status sensor 127 senses the position of the ignition switch and inputs a signal representative of that position via line 133A to the digital input signal conditioner 130. Similarly, status sensor 127 senses the position of the manual reset switch and inputs a representative signal to the digital input signal conditioner 130 via line 133E. The ignition switch signal is ultimately used to generate an IGNITION ENABLE signal for resetting system 100 and enabling the vehicle via line 175. The RESET signal via line 178 resets the CO detectors 103 and 118 by clearing a FAULT flag in the control logic circuit 112. The FAULT flag indicates the presence of a HIGH CO signal was detected.

Figure 2:
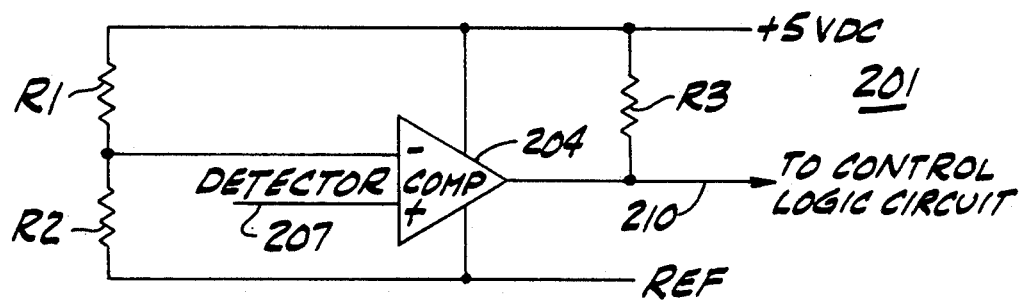
FIG. 2 is a partial schematic diagram of one preferred embodiment of the analog signal conditioner shown in FIG. 1.

The analog signal conditioner 109 interfaces the outside CO detector 103 and the inside CO detector 118 to the control logic circuit 112. Preferably, tills signal interface is identical for both CO detectors 103 and 118 and is a relatively simple voltage detector 201 with a variable threshold as shown in FIG. 2. The threshold represents a predetermined level of CO and may be varied depending on the CO concentration predetermined to be undesirable by changing the values of resistors R1 and R2. A comparator 204 compares the analog signal provided by the detectors via line 207 to one of the predetermined levels. The analog signal via line 207 represents the signal via line 106 from tile outside CO detector 103 or the signal via line 121 from tile inside CO detector 118. Comparator 204 outputs a comparison signal (OUTSIDE CO or INSIDE CO) via line 210 to the control logic circuit 112 representing the detected CO level. The OUTSIDE CO signal is logic level high or logic level low depending on tile detected concentration of CO outside the compartment. Similarly, the INSIDE signal is logic level high or logic level low depending on the detected concentration of CO inside the compartment. Comparator 204 may be embodied as a Texas Instruments or National LM-311 comparator. Additionally, the input pins of comparator 204 may be capacitively filtered to eliminate generation of false signals due to electrical noise on the input lines.

Figure 3:
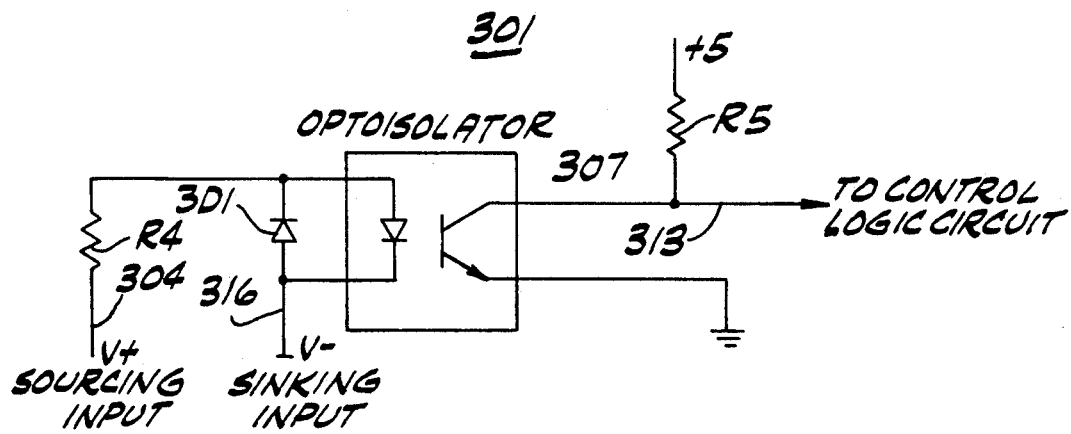
FIG. 3 is a partial schematic diagram of one preferred embodiment of the digital input signal conditioner shown in FIG. 1.

FIG. 3 illustrates one embodiment of the digital input signal conditioner 130 for different types of input vehicle has a 12 volts (dc) battery supply which powers system 100. However, batteries such as those installed in automobiles, typically operate between 6 and 20 volts due to partial discharge or accelerated charging potentials. Therefore, the digital input signal conditioner 130 must be operable within the voltage range of an automobile battery. Further, isolating the battery supply voltage from the logic voltage of the control logic circuit 112 advantageously prevents voltage spikes which interfere with the operation of the control logic circuit 112. Voltage spikes are often caused by operation of the vehicle's starter, horn, ignition system and other electrical components. Preferably, four terminal devices providing up to 1500 volts isolation from input to output may be used to provide isolation. The digital input signal conditioner 130 provides the necessary isolation between the battery supply and the control logic circuit 112. Typically, for switches and other logic level signals, optical isolators provide an isolated signal at low cost.

FIG. 3 shows an input interface 301 which is one preferred embodiment of tile input signal conditioner 30. Status sensor 127 inputs a sourcing signal via line 304 to the input interface 301. Line 304 represents one of the lines 133A-133E of FIG. 1. The sourcing input indicated by V+, is the input power supply voltage which is nominally +12 volts and is fed through a current limiting resistor R4. In this embodiment, the sinking input is connected to the reference side of the input power supply. Therefore, a nominal 20 milliamps current flows into an input diode of an optoisolator 307 via line 310 and back to ground through the sinking input. An additional diode D1 is shown connected in a reverse-biased configuration to prevent damage to the optoisolator 307 caused by reverse voltage transients. If the voltage is low (e.g., +6 volts), only 10 milliamps will flow into the optoisolator 307. However, 10 milliamps is sufficient to provide a positive logic level at an output 313. Similarly, an input voltage which is high (e.g., +20 volts), will cause a current of about 34 milliamps to flow into the optoisolator 307. The output of the optoisolator 307 is preferably an npn transistor with both emitter and collector leads brought out. As shown, the emitter is referenced to the logic reference, and the collector is connected to a pull-up resistor R5 which is referenced to the +5 volts (dc) logic supply. In this manner, the optoisolator 307 provides an active logic level low signal when the input is on. Typically, a device such as the optoisolator 307 has a current rating of approximately 50 milliamps continuous and may be embodied by the 4N26 series available from General Electric, TRW and other sources. An example of a sourcing input is an ignition switch which supplies power to the circuit 301 when placed in its on position.

Alternatively, in a sinking mode of operation, the sourcing input 304 is connected to the +12 volt power supply and the input is connected from the sinking input 316 to ground. When the input turns on, current flows from the +12 volt supply, through R4, through the optoisolator 307 diode and through the ignition switch to ground. The vehicle frame typically provides the ground path for the sinking input mode of operation.

Figure 4A:
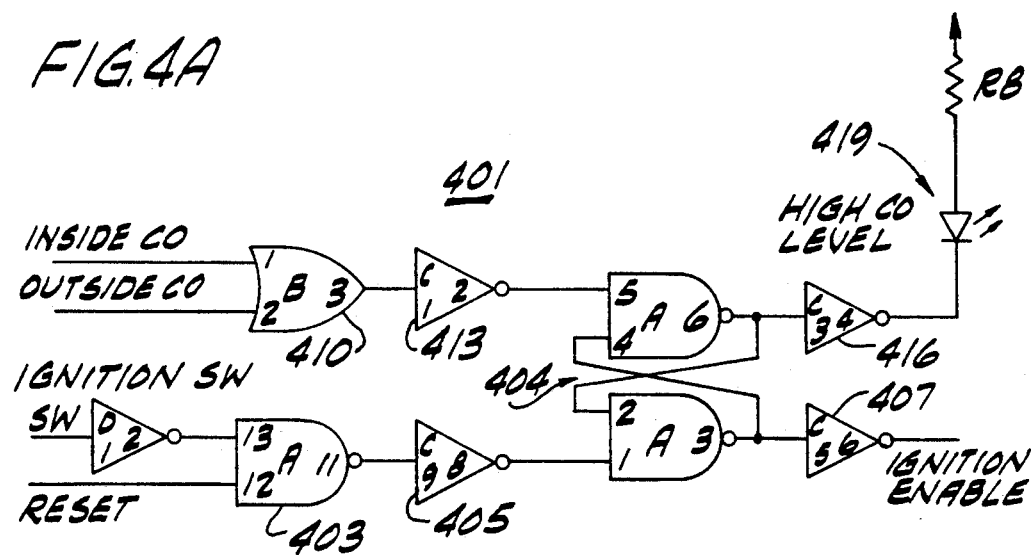
FIGS. 4A and 4B are partial schematic diagrams of one preferred embodiment of the control logic circuit shown in FIG. 1.

One preferred embodiment of control circuit 112, as shown in FIG. 4A, is a solid state logic gating circuit. The control logic circuit 112 includes a logic circuit 401 for generating an enabling signal and for indicating a high level of CO. As mentioned above, a HIGH CO signal preferably drives the engine disabler 151. An input signal from the ignition switch via line 136A or from an optional reset switch via line 136E is used to initiate system 100. The ignition switch signal is input to an inverter 402 at D1 which outputs a signal at D2. The output signal of inverter 402 is input to a two input NAND gate 403 via input A13. The optional reset switch may be used to input a signal to NAND gate 403 via A12. In this manner, the ignition switch signal is normally logic level low on line 136A and inverted by inverter 402 to provide a high signal to NAND gate 403 at input A13. The reset signal is normally logic level high such that the output signal from NAND gate 403 is normally logic level low at A11. This signal is applied to an input A1 of an R-S flip-flop 404 after being inverted by an inverter 405. Control circuit 112 resets when either tile reset input signal at A12 goes low or when the ignition switch is turned off such that input D1 of inverter 402 is high. Either of these occurrences forces the output signal of NAND gate 402 at A11 to go high. A logic level high at A11 causes a logic level low to be input to flip-flop 404 at A1 for enabling the vehicle's ignition system. The logic level low signal forces the output signal via A3 to become logic level high. The signal at output A3 is fed into input A4 of the flip-flop 404 as well as being inverted to a logic level low at C6 of an inverter 407. The low signal at C6 is the IGNITION ENABLE signal which indicates that the ignition switch is in its on position for enabling system 100.

The input signal to the flip-flop 404 via A5 is high when the concentrations of CO detected both inside and outside the compartment are below the predetermined levels. If tile input signal via A4 is also logic level high, then the signal via output A6 will be logic level low. Thus, flip-flop 404 is latched after the low ignition input signal at A1 returns to a logic level high. At this time, the IGNITION ENABLE active output signal at C6 will be low. A low level IGNITION ENABLE signal at C6 activates system 100. System 100 will stay in this state until either the INSIDE CO signal or the OUTSIDE CO signal is logic level high.

When the signal via output B3 of an OR gate 410 is high, the signal via output C2 of an inverter 413 becomes a logic level low. Inputting a low level signal to A5 of flip-flop 404 causes the output signal via A6, which is input to A2, to become logic level high. The resulting logic level low output signal at A3 causes the IGNITION ENABLE signal to be high, or off, which disables the ignition system. An inverter 416 inverts the signal via output A6 which is high when the detected concentration of CO either inside or outside the compartment is greater than one of the predetermined levels. A further improvement to the invention may include timers on the lines B1 and B2 for inhibiting disabling of the engine by engine disabler 151 until the respective INSIDE CO or OUTSIDE CO signal is high for longer than a preset period of time. If the output signal at A6 is high, then C4 of inverter 416 is low. A logic level low at C4 causes current to flow through current limiting resistor R8 which activates a high CO level indicator 419 (such as a light emitting diode). The high CO level indicator 419 can inform the vehicle's operator of the cause of the subsequent engine disablement. In this mariner, circuit 401 generates a HIGH CO signal when system 100 is enabled by the IGNITION ENABLE signal. As mentioned above, system 100 resets by the ignition switch being turned to its off position or by the manual reset switch.

Figure 4B:
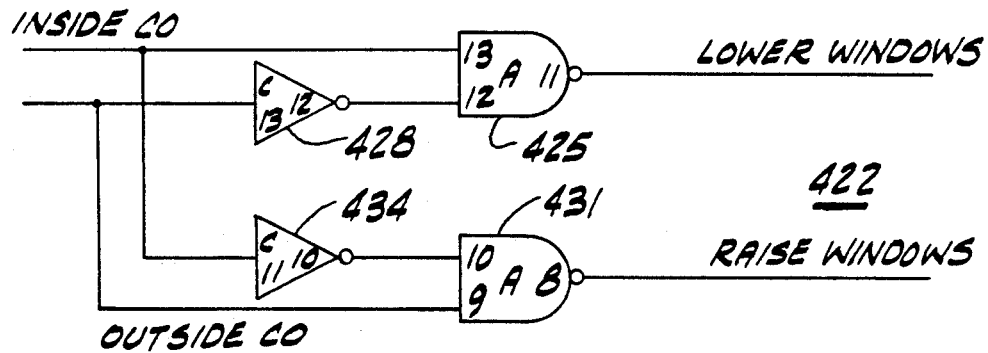

Referring to FIG. 4B, signals designated LOWER WINDOW and RAISE WINDOW represent whether the detected concentration of CO is greater inside the compartment or outside the vehicle, respectively. Preferably, the INSIDE CO and OUTSIDE CO signals are input to a window logic circuit 422. INSIDE CO is input [o a NAND gate 425 via input A13 and OUTSIDE CO is input to an inverter 428 via input C13. Inverter 428 outputs the inverse of OUTSIDE CO at C12 for inputting to gate 425 via input A12. Similarly, OUTSIDE CO is input via A9 to a NAND gate 431 and INSIDE CO is input via C11 to an inverter 434. Thus, inverter 434 outputs tile inverse of INSIDE CO at C10 for inputting via A10 to gate 431.

The window logic circuit 422 operates by the following example: A HIGH CO signal present at line 124 (INSIDE CO is logic level high) but not present at line 115 (OUTSIDE CO is logic level low) causes the control logic circuit 112 to generate the LOWER WINDOW signal which instructs the window controller 154 to energize the vehicle's power windows to open the windows. In a preferred embodiment, if INSIDE CO is high and OUTSIDE CO is low, the signal LOWER WINDOW at output A11 becomes logic level low. A low level signal at output A11 causes the window controller 154 to lower the vehicle's windows to allow CO in the compartment to escape. Conversely, if INSIDE CO is low and OUTSIDE CO is high, the RAISE WINDOW signal at output A8 becomes low. A low level output signal from gate 431 causes the window controller 154 to raise the vehicle's windows to prevent CO outside the vehicle from entering the compartment through open windows.

The following Table 1 shows the different possibilities and outcomes of window logic circuit 422:

TABLE 1

| INSIDE CO | OUTSIDE CO | LOWER WINDOW | RAISE WINDOW | Operation |
| --- | --- | --- | --- | --- |
| low | low | high | high | no change |
| low | high | high | low | close window |
| high | low | low | high | open window |
| high | high | high | high | no change |

Alternatively, window controller 154 may open the vehicle's windows when a high concentration of CO is detected both inside and outside the compartment.

Figure 5:
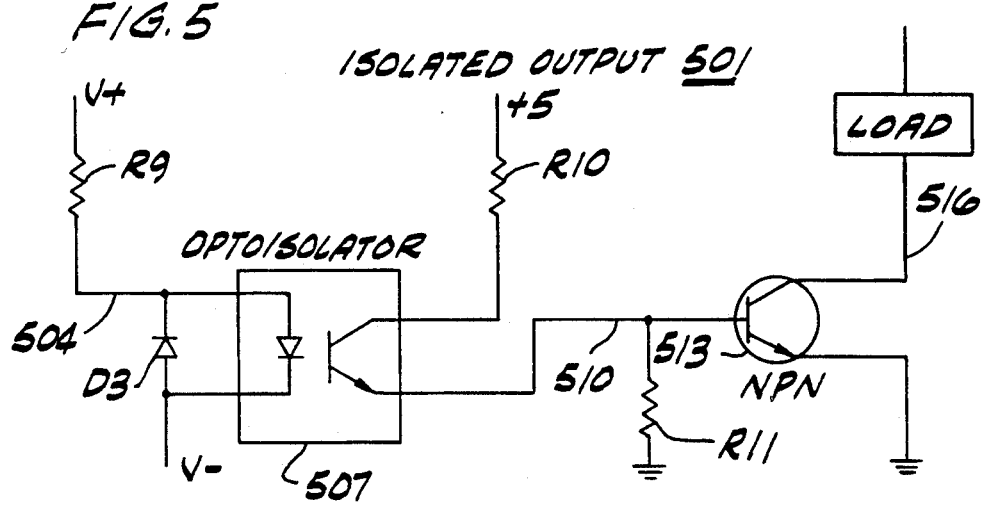
FIG. 5 is a partial schematic diagram of one preferred embodiment of tile digital output signal interface shown in FIG. 1.

Referring to FIG. 5, the particular embodiment of the digital output signal interface 145 depends on the type of signal necessary to drive the particular components of system 100, such as the engine disabler 151 or the window controller 154. The output signal interface 145 consists of a set of outputs which are ideally compatible with the existing hardware used in the modern automobile. A relay providing a set of contacts which can be interconnected with existing wiring in the vehicle offers a simple and clean interface. Other solid state output devices with isolated open collector type outputs can also be used if the hardware interface application is known.

FIG. 5 shows an isolated output circuit 501 which inputs a signal via line 504 to an optoisolator 507. Line 504 represents one of the lines 148A–148H of FIG. 1. Optoisolator 507 is similar to optoisolator 307 of the digital input signal conditioner 130 and isolates the logic supply from load power. The load, for example, is the engine disabler 151 or the window controller 154. The output of the optoisolator 507 at line 510 is connected to an input transistor 513, which is used as an output amplifier. If the optoisolator 507 is in a nonconducting, or off, state, no base current flows into transistor 513 and, therefore, no current flows via line 516 to the load. Current flow in the base of the transistor 513 via line 510 forces the load current via line 516 to flow. In this manner, power is provided to the load. A resistor R9 limits the current being conducted by the optoisolator 507. A resistor R11 ensures cutoff of the output transistor 513 when the optoisolator 507 is in an off state. Other configurations including relays are contemplated as power switching devices.

The digital input signal conditioner 130 and the digital output signal interface 145 may be used for various implementations of the control logic circuit 112 desired, including microprocessors which can be integrated into existing systems or designed as stand alone devices.

In one preferred embodiment, system 100 includes the inside CO detector 118 being used in connection with a vehicle laving an automatic transmission with a gear shift lever. The status sensor 127 determines when the gear shift lever is in a PARK position or a NEUTRAL position, which generally indicates that the vehicle is stationary. System 100 disables operation of the engine in response to the HIGH CO signal only when the lever is in one of these two positions.

Figure 6:
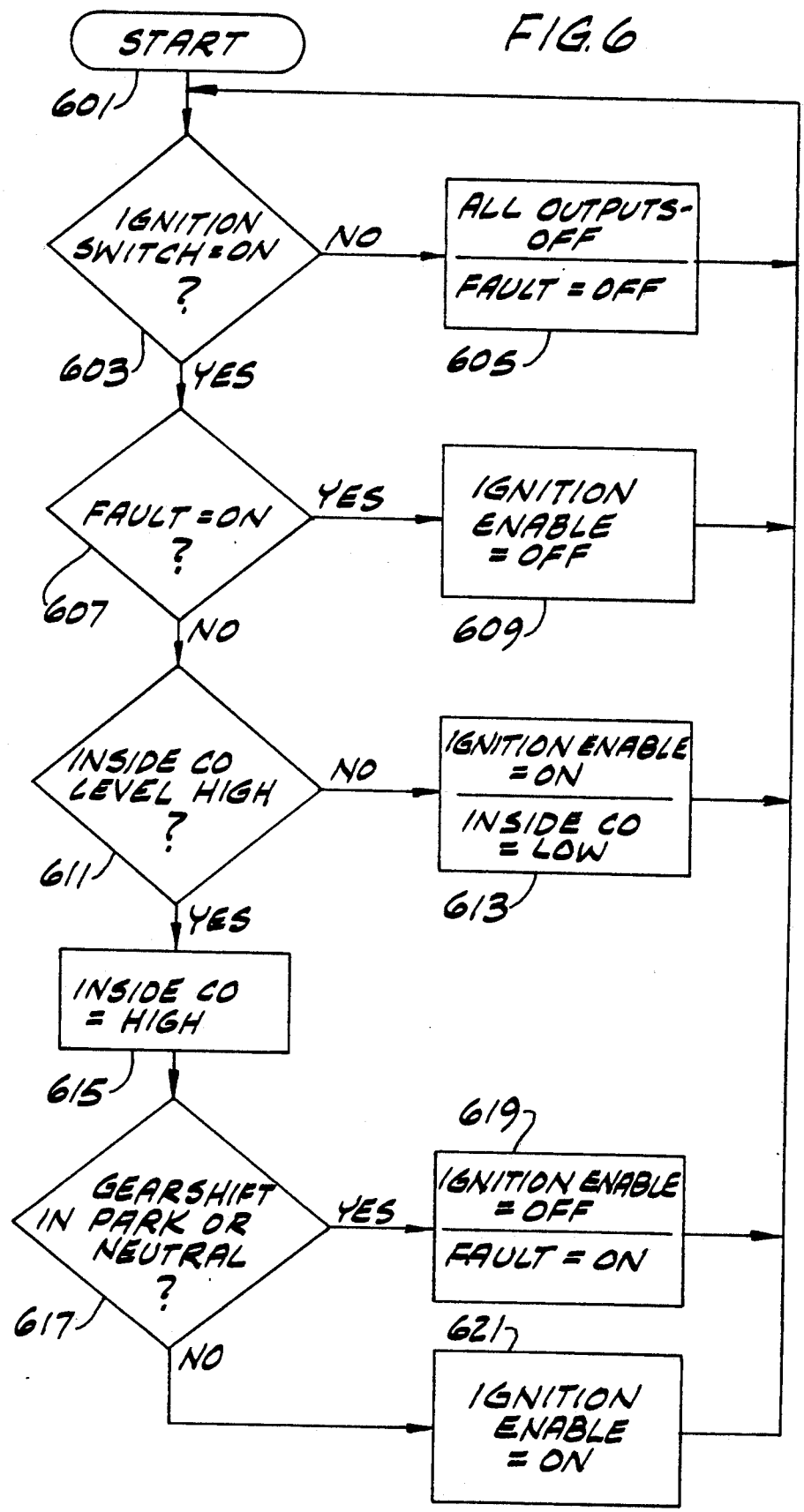
FIG. 6 is a flow diagram of the operation of one preferred embodiment of tile invention.

The flow diagram of FIG. 6 describes operation of such a system beginning at step 601. The status sensor 127 senses the position of the ignition switch at step 603 and inputs a signal via line 133A to the digital signal conditioner 130. If the ignition switch is in its off position, all outputs are turned off (IGNITION ENABLE is logic level high; INSIDE CO is logic level low), as indicated by block 605, and system 100 waits for power to be restored. In addition, a FAULT flag is cleared at block 605. The FAULT flag indicates the presence of a previous HIGH CO signal and remains on until system 100 has been reset.

If the ignition switch is in its on position, system 100 determines at step 607 whether a FAULT flag is present. If a previous FAULT exists, the control logic circuit 112, which may include a microprocessor, will deactivate system 100, and disable the vehicle, as indicated at block 609. Block 609 shows the IGNITION ENABLE signal is off (logic level high). System 100 keeps the FAULT flag set until the ignition switch input is turned to its off position, which clears the FAULT flag, and then returns to its on position (as determined by step 603). Thus, the need for an external RESET input to clear the FAULT flag is eliminated. If tile FAULT flag is not set, system 100 checks tile inside CO detector 118 at step 611 to determine if the concentration of CO in the compartment is excessive. This step is necessary to prevent the IGNITION ENABLE signal from turning back on (logic level low) following a FAULT when the ignition switch is still in its on position. Assuming that the FAULT flag is not set and the CO detector 118 does not detect the presence of excessive CO in the compartment, the IGNITION ENABLE output becomes logic level low for enabling tile system and the visual or audible alarm (if present) is set to a low CO level status, as indicated at block 613.

A high INSIDE CO signal indicates that excessive CO is detected by the inside CO detector 118, as shown at block 615. The high INSIDE CO signal can be used to activate the audible or visual warning, if desired. System 100 may produce audible and/or visual warnings in response to the INSIDE CO signal being high when the detected concentration of CO is greater than the second predetermined level.

The status sensor 127 senses the position of the gear shift lever at step 617. If the lever is either in a PARK or a NEUTRAL position, as indicated by the inputs via lines 133B and 133C, the IGNITION ENABLE output turns off (logic level high) and the FAULT flag is set, as shown in block 619. In this particular state, tile IGNITION ENABLE signal cannot be restored until the ignition switch is returned to its off position. The engine disabler 151 may use the IGNITION ENABLE signal to open a contact or disable an input for disabling the vehicle's engine. Therefore, if IGNITION ENABLE is allowed to be on (logic level low) after the FAULT flag is cleared, because the ignition switch is in its on position, then tile automobile's battery could discharge and cause excessive strain on the ignition components. The FAULT flag prevents the ignition from being reenabled until system 100 is reset by turning the ignition switch to its off position or by pressing an optional manual reset push button. In each instance, however, the ignition switch connection will be broken in the event of excessive CO being detected in the compartment when the gear shift is in PARK or NEUTRAL.

In the event the gear shift is not in PARK or NEUTRAL, the IGNITION ENABLE signal is maintained on (logic level low) to ensure that the vehicle's ignition system remains on when the vehicle is moving, as indicated at block 621.

If the vehicle comes to rest in a snow bank, for example, and the gear shift lever is in a position other than PARK or NEUTRAL, an audible or visual warning off the hazardous concentration of CO is particularly desirable for warning the vehicle's passengers of the dangerous level of CO.

Figure 7:
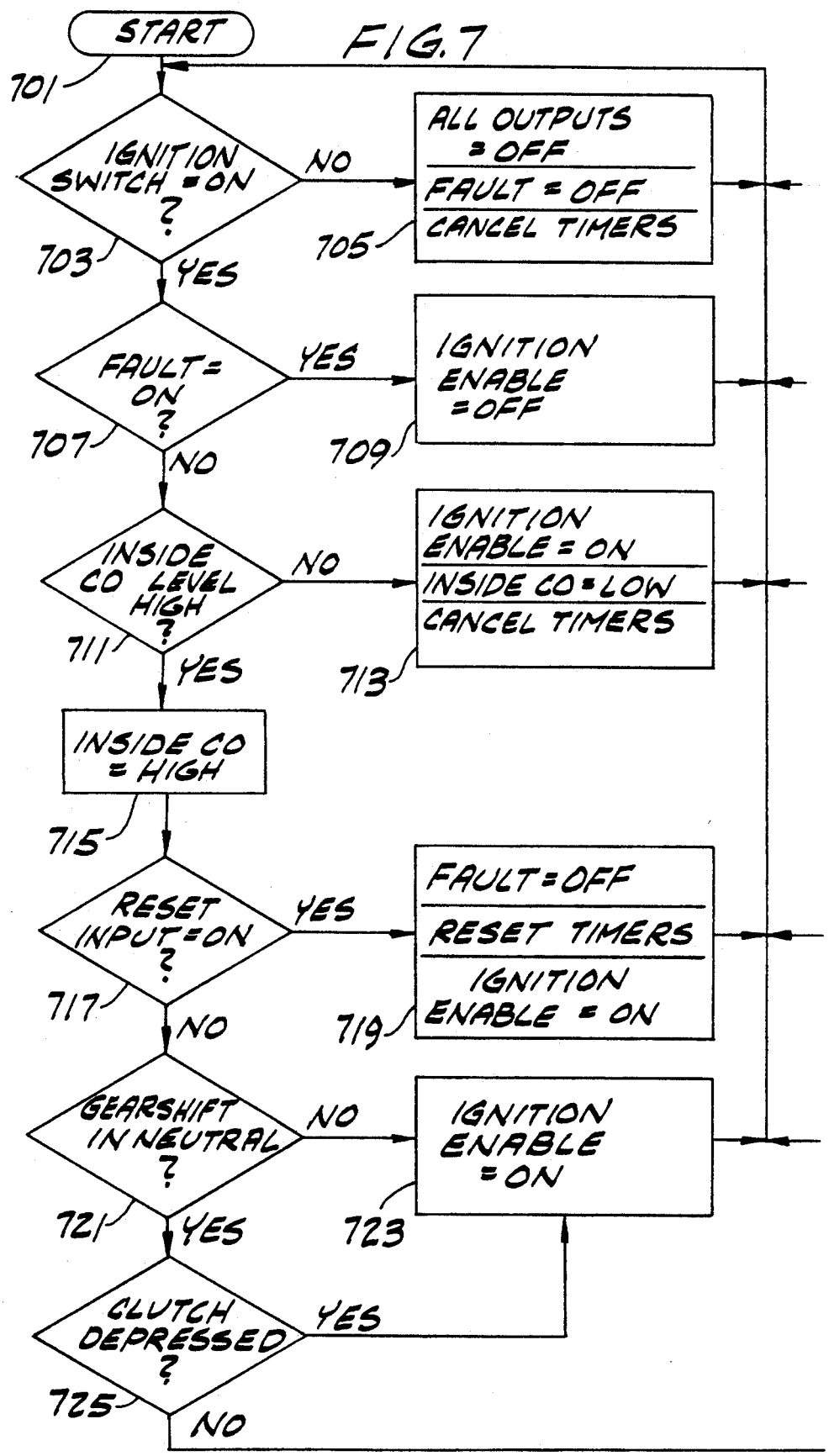
FIG. 7 and 7A are a flow diagram of the operation of another preferred embodiment of the invention.
Figure 7A:
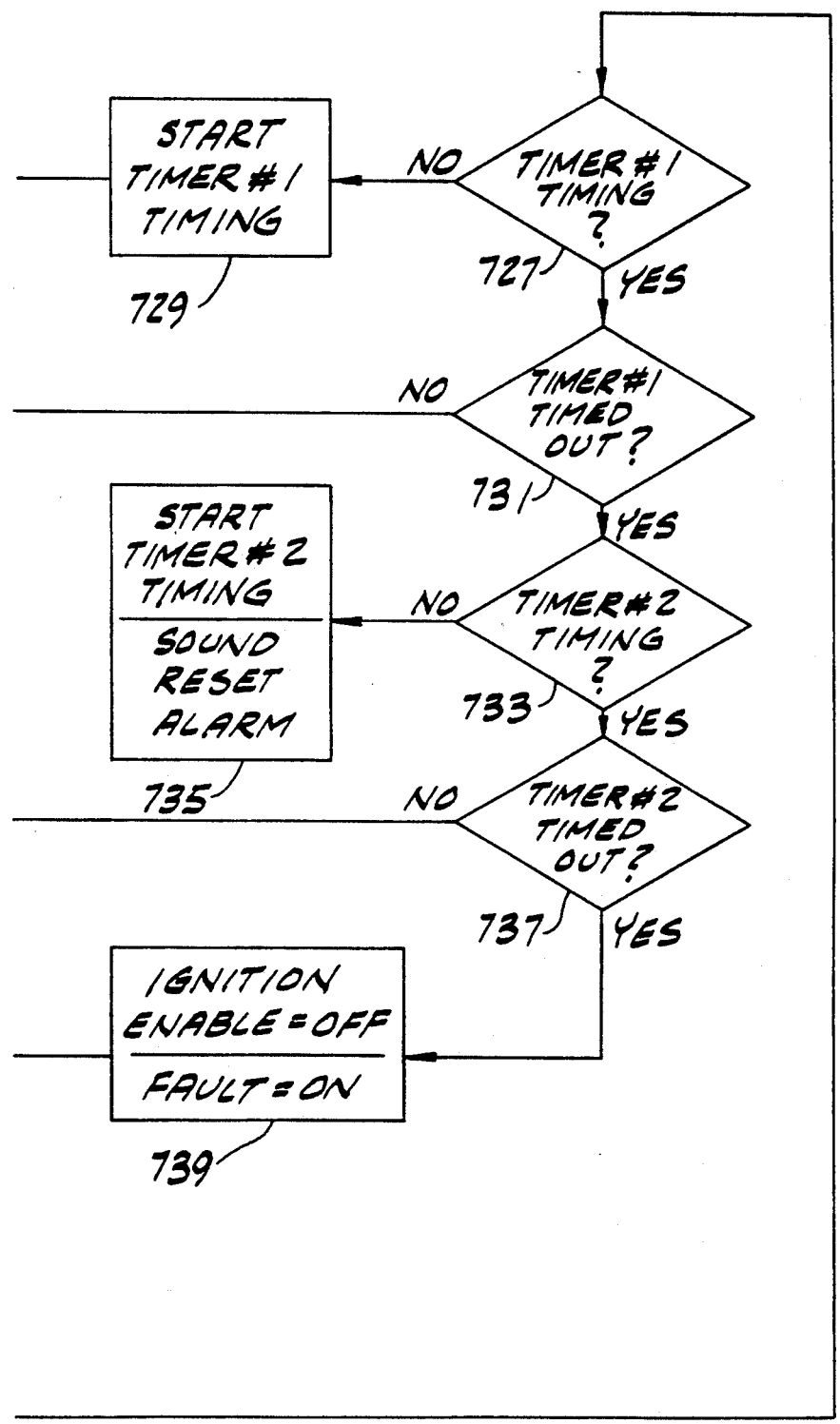

FIG. 7 describes operation of another preferred embodiment of the invention. In this embodiment, the vehicle has a manual transmission with a clutch and a gear shift lever. The clutch is movable between a DEPRESSED position and a NONDEPRESSED position and the gear shift lever is movable between a plurality of positions, one of which is a NEUTRAL position. The status sensor 127 determines when the lever is in the NEUTRAL position and when the clutch is in the NONDEPRESSED position. Signals representing these positions are input via lines 133C and 133D, respectively, to the digital signal conditioner 130. System 100 disables operation of the engine only when the sensed position of the lever is the NEUTRAL position and the sensed position of the clutch is the NONDEPRESSED position. In other words, system 100 inhibits the disabling of tile engine when the gear shift lever is in a position other than NEUTRAL or when the clutch is DEPRESSED. hazardous levels of CO might be present when the vehicle is not moving, such as during a traffic jam. In these situations, however, the operator will typically position the gear shift lever in NEUTRAL and release the clutch during a prolonged stopping period.

System 100 may include at least one timer for determining the length of time that a HIGH CO signal is present. As such, system 100 will not disable operation of the engine when the detected concentration of CO is greater than the predetermined level for shorter than a predetermined length of time.

Steps 701-711 of FIG. 7 are generally identical to steps 601-611, respectively, as described above with respect to FIG. 6, with the exception that blocks 705 and 713 additionally cancel the timers. If the ignition switch is in its off position, the FAULT flag is cleared and system 100 cancels all timers, as indicated at block 705. If the ignition switch is in its on position, and the FAULT flag is cleared, system 100 will also cancel all timers, when the concentration of CO inside the compartment is low, as indicated at block 713. Similar to the previous embodiment, a FAULT flag may be cleared by turning the ignition switch to its off position and then to its on position. After the inside CO detector 118 detects an excessive level of CO, the INSIDE CO signal becomes logic level high at block 715. Again, this signal may also activate an audible or visual alarm.

A manual reset switch may be included in system 100 to generate a RESET signal. RESET allows the vehicle to continue operation even though high levels of CO have been detected. RESET is regulated by two timers which will be discussed in detail below. If the reset switch is activated, at step 717, all outputs are restored, the FAULT flag is cleared, and the IGNITION ENABLE output is on (logic level low), as shown at block 719. If the reset switch is not activated, system 100 proceeds to step 721. Step 721 determines whether or not the gear shift lever is in its NEUTRAL position. If not, the IGNITION ENABLE output remains on (logic level low) at block 723. At step 725, if the gear shift is in a position other than NEUTRAL or if the clutch is DEPRESSED, the IGNITION ENABLE output will remain on (logic level low) at block 723 and the timers will not be started.

System 100 determines whether a first timer is timing at step 727 when the gear shift is in NEUTRAL and the clutch is NONDEPRESSED. The first timer begins timing at block 729. At step 731, if the HIGH CO state exists for more than the predetermined length of time, such as one minute, system 100 checks at step 733 whether a second timer has started timing. If timing has not begun, the second timer begins timing and a RESET alarm is turned on, as shown at block 735. The RESET alarm will continue to sound for a length of time, for example, 30 seconds, or until the reset switch is activated. The reset switch resets the timers and clears the FAULT flag while allowing the operation of the engine to continue.

Whether the second timer has timed its predetermined interval is decided at step 737. If the second timer times out, the FAULT flag is set and the IGNITION ENABLE output is off (logic level high) as shown at block 739. Once in this state, the ignition switch must be turned to its off position before system 100 resets. Thus, system 100 requires the vehicle operator to manually clear the condition with the reset switch.

The operation of yet another embodiment is described in FIG. 8. Preferably, system 100 includes both the outside CO detector 103 and the inside CO detector 118 and generates HIGH CO signals when the detected concentration of CO either inside or outside the compartment is greater than the respective predetermined levels.

Steps 801-811 are identical to steps 701-711, respectively, described above with respect to FIG. 7.

When INSIDE CO is logic level low, the IGNITION ENABLE output is maintained on (logic level low) at block 813 and the indication of compartment CO concentration is updated, but the timers are not canceled as they were previously. Instead, the outside CO detector 103 is checked at step 815. The timers will only be canceled, as shown at block 817, if the outside CO detector 103 is not detecting harmful levels of CO. Block 817 also shows turning the power window output signals off (RAISE WINDOW is logic level high and LOWER WINDOW is logic level high). The operation of system 100 returns to start at step 801 from block 817.

If the outside CO detector 103 detects an undesirable concentration of CO, while the inside CO detector 118 does not, the RAISE WINDOW signal is given at block 819 to close tile windows, thus, preventing CO from entering the compartment through open windows.

When the level of CO inside the passenger compartment is excessive but the level of CO outside the vehicle is tolerable, as determined at step 823, the LOWER WINDOW signal is given at block 825 to open the windows, thus, allowing the CO to escape the compartment into the outside air. If both inside CO detector 118 and outside CO detector 103 detect high levels of CO, as shown at block 827, system 100 detects the reset switch position input signal at step 829. Should the RESET signal be on, system 100 clears the FAULT flag, resets the timers, turns the window output signals off (logic level high), and maintains the IGNITION ENABLE signal on (logic level low), as shown at block 831. At step 833, the motion sensor is sensed if the RESET input signal is off. The output signals remain in their present states at block 835 if the vehicle is in motion.

System 100 detects whether the vehicle's gear shift lever is in PARK or NEUTRAL at step 837. If the lever is in a position other than PARK or NEUTRAL, the timer operation will be bypassed. Otherwise, the two timer operation will be repeated. At step 839, system 100 determines whether tile first timer is timing. If not, the first timer begins timing at block 841. After the first timer times out, at step 843, system 100 determines whether a second timer has started timing at step 845. If not, the second timer begins timing and the RESET alarm is turned on, as shown at block 847. When the second timer times out, at step 849, the IGNITION ENABLE is off (logic level high) and tile FAULT flag is set, as shown at block 851.

Referring to FIG. 9, steps 901-927 are identical to steps 801-827, respectively, described above with respect to FIG. 8.

Excessive concentrations of CO detected by the inside CO detector 118 or tile outside CO detector 103 status of the motion sensor triggers tile motion sensor to be checked at step 929. If tile motion sensor indicates that the vehicle is in motion, the timers are canceled and the IGNITION ENABLE output is turned on (logic level low) at block 931. At step 933, if the vehicle is stationary and tile timer is not timing, the timer will start timing at block 935. The timer allows a short period (for example, 30 seconds) when a HIGH CO signal is present before disabling the vehicle's ignition system. Once the timer times out at step 937, system 100 turns the IGNITION ENABLE signal off (logic level high) and sets the FAULT flag at block 939. The engine may be disabled at this time. The timer allows the engine to be restarted (after the ignition switch is returned to its off position) to move tile vehicle following a disablement. Otherwise, the vehicle could not be restarred after the hazardous concentration of CO has dissipated. If the engine is restarted and no motion occurs for the duration set on tile timer, and high levels of CO are still detected, system 100 again disables the engine.

In view of the above, it will be seen that the several objects of tile invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A system for monitoring carbon monoxide (CO) levels produced by a vehicle having an engine and having a passenger compartment, the operation of the engine producing CO as a by-product, said system comprising:

a detector in the passenger compartment for detecting the concentration of CO inside the compartment;

means for generating a HIGH CO signal when the detected concentration of CO inside the compartment is greater than a predetermined level;

means for disabling the operation of the engine in response to the HIGH CO signal and preventing re-enabling of the operation of the engine during periods when the HIGH CO signal is present;

means for sensing a status condition of the vehicle; and means for inhibiting the disabling of the engine when the sensing means senses the status condition.

2. The system as set forth in claim 1 wherein the vehicle has an automatic transmission having a gear shift lever and wherein the sensing means comprises means for determining when the gear shift lever is in park or neutral and wherein said means for disabling disables operation of the engine only when the sensed position of the lever is park or neutral.

3. The system as set forth in claim 1 wherein the vehicle has a manual transmission having a gear shift lever having a neutral position and a clutch movable between a depressed position and a nondepressed position and wherein the sensing means comprises means for determining when the gear shift lever is in the neutral position and when the clutch is in the nondepressed position and wherein said means for disabling disables operation of the engine only when the sensed position of the lever is the neutral position and the sensed position of the clutch is the nondepressed position.

4. The system as set forth in claim 1 wherein the sensing means comprises means for sensing vehicle motion and wherein the inhibiting means inhibits the disabling of the engine when vehicle motion is sensed.

5. The system as set forth in claim 1 wherein the vehicle has an output shaft which moves when the vehicle is in motion and wherein the sensing means comprises means for determining when the output shaft moves and wherein the inhibiting means inhibits the disabling of the engine when motion of time shaft is sensed.

6. The system as set forth in claim 1 wherein the vehicle has means for providing a signal which indicates vehicle speed and wherein the sensing means comprises means for determining when the speed signal indicates that the vehicle is in motion and wherein the inhibiting means inhibits the disabling of the engine when the detected speed signal indicates the vehicle is in motion.

7. The system as set forth in claim 1 wherein said means for disabling disables the engine only when the detected concentration of CO is greater than the predetermined level for longer than a predetermined length of time.

8. The system as set forth in claim 7 wherein the sensing means comprises a timer for determining the length of time that the detected concentration of CO is greater than the predetermined level and wherein the inhibiting means inhibits tile disabling of the engine when the detected concentration of CO is greater than the predetermined level for shorter than the predetermined length of time.

9. The system as set forth in claim 8 wherein tile vehicle has an ignition switch having an on position and an off position and wherein the timer includes means for resetting the timing of the predetermined length of time when the ignition switch is in the off position.

10. The system as set forth in claim 9 wherein the sensing means comprises means for sensing vehicle motion and wherein the inhibiting means inhibits the disabling of the engine when vehicle motion is sensed.

11. The system as set forth in claim 1 wherein tile vehicle has an ignition system for enabling tile engine and wherein said means for disabling the engine includes means for inhibiting operation of tile ignition system in response to the HIGH CO signal so that the ignition system does not enable the engine.

12. The system as set forth in claim 1 wherein the vehicle has an electric fuel pump for providing fuel to tile engine and wherein said means for disabling the engine includes means for inhibiting operation of the electric fuel pump in response to the HIGH CO signal so that the fuel pump does not provide fuel to the engine whereby operation of the engine is disabled.

13. The system as set forth in claim 3 wherein the vehicle has electronic fuel injection means for providing fuel to the engine and wherein said means for disabling the engine includes means for inhibiting operation of the fuel injection means in response to the HIGH CO signal so that the fuel injection means does not provide fuel to the engine whereby operation of the engine is disabled.

14. The system as set forth in claim 1 wherein the vehicle has a fuel line for supplying fuel to the engine and wherein said means for disabling the engine includes a valve in the fuel line and means for closing the valve in response to the HIGH CO signal so that fuel is prevented from flowing through the fuel line to the engine whereby operation of the engine is disabled.

15. The system as set forth in claim 1 further comprising means for producing an audible warning in response to the HIGH CO signal when the detected concentration of CO is greater than the predetermined level.

16. The system as set forth in claim 1 further comprising means for producing a visual warning in response to the HIGH CO signal when the detected concentration of CO is greater than the predetermined level.

17. The system as set forth in claim 1 wherein the vehicle has an ignition switch having an off position for disabling the vehicle and an on position for enabling the vehicle and further comprising means for deactivating said system when the ignition switch is in the off position axial each activating said system when the ignition switch is in the on position.

18. The system as set forth in claim 1 wherein the vehicle has an ignition switch having an off position for disabling tile vehicle and all on position for enabling the vehicle and further comprising means for resetting said means for disabling the engine when tile ignition switch is in the off position.

19. The system as set forth in claim 1 further comprising a second detector for detecting tile concentration of CO outside the compartment and means for generating a second HIGH CO signal when tile detected concentration of CO outside the compartment is greater than a second predetermined level, said means for disabling the engine being responsive to the second HIGH CO to disable operation of the engine.

20. The system as set forth in claim 19 wherein the vehicle has windows and means for opening/closing the windows and further comprising means for energizing the opening/closing means to open tile windows when the first HIGH CO signal indicates that the detected concentration of CO inside tile compartment is equal to or greater than the first predetermined level and that the detected concentration of CO outside the compartment is less than the second predetermined level.

21. The system as set forth in claim 20 further comprising means for energizing the opening/closing means to close the windows when the second HIGH CO signal indicates that the concentration of CO outside the compartment is greater than the second predetermined level and the concentration of CO inside the compartment is less than the first predetermined level.

22. The system as set forth in claim 21 further comprising means for generating a LOWER WINDOW signal and a RAISE WINDOW signal wherein said means for energizing the opening/closing means to open tile windows is responsive to tile LOWER WINDOW signal and said means for energizing the opening/closing means to close tile windows is responsive to tile RAISE WINDOW signal.

23. The system as set forth in claim 22 wherein tile vehicle has all ignition switch having an on position and all Off position and wherein said means for generating tile LOWER WINDOW and RAISE WINDOW signals includes means for resetting when tile ignition switch is in the off position whereby said means for energizing the opening/closing means to open the windows and said means for energizing the opening/closing means to close the windows are continually responsive to the LOWER WINDOW and RAISE WINDOW signals, respectively, until said means for generating the LOWER WINDOW and RAISE WINDOW signals is reset.

24. A system for monitoring carbon monoxide (CO) levels produced by a vehicle having an engine and having a passenger compartment, the operation of the engine producing CO as a by-product, said system comprising:
- a first detector outside the passenger compartment for detecting the concentration of CO outside the compartment;
- means for generating a first signal representative of the detected concentration of CO outside the compartment; and
- means for disabling the operation of the engine in response to the first signal when the concentration of CO detected by the first CO detector is greater than a first predetermined level and preventing re-enabling of the operation of the engine during periods when the first signal is present.

25. The system as set forth in claim 24 further comprising a second detector for detecting the concentration of CO inside the compartment and means for generating a second signal representative of the concentration of CO inside the compartment and wherein the disabling means disables the engine in response to the second signal when the concentration of CO detected by the second CO detector is greater than a second predetermined level.

26. The system as set forth in claim 25 wherein the disabling means disables the engine only when both the first signal indicates a detected concentration greater than the first predetermined level and the second signal indicates a detected concentration greater than the second predetermined level.

27. The system as set forth in claim 25 wherein the disabling means disables the engine when the detected concentration of CO is greater than at least one of the predetermined levels for longer than a predetermined length of time.

28. The system as set forth in claim 27 further comprising a timer for determining the length of time that the detected concentration of CO is greater than at least one of the predetermined levels and comprising means for inhibiting the disabling of the engine when the detected concentration of CO is greater than at least one of the predetermined levels for shorter than a predetermined length of time.

29. The system as set forth in claim 28 wherein the vehicle has an ignition switch ]laving an on position and an off position and wherein the timer includes means for resetting the timing of the predetermined length of time when tile ignition switch is in the off position.

30. The system as set forth in claim 25 further comprising means for generating a first HIGH CO signal when the detected concentration of CO outside tile compartment is greater than the first predetermined level and for generating a second HIGH CO signal when the detected concentration of CO inside the compartment is greater than the second predetermined level.

31. The system as set forth in claim 30 wherein tile vehicle has an ignition system for enabling the engine and wherein the disabling means includes means for inhibiting operation of the ignition system in response to at least one of the HIGH CO signals so that the ignition system does not enable the engine.

32. The system as set forth in claim 30 wherein the vehicle has an electric fuel pump for providing fuel to the engine and wherein the disabling means includes means for inhibiting operation of the electric fuel pump in response to at least one of the HIGH CO signals so that the fuel pump does not provide fuel to the engine whereby operation of tile engine is disabled.

33. The system as set forth in claim 30 wherein the vehicle has electronic fuel injection means for providing fuel to tile engine and wherein the disabling means includes means for inhibiting operation of tile fuel injection means in response to at least one of the HIGH CO signals so that the fuel injection means does not provide fuel to the engine whereby operation of the engine is disabled.

34. The system as set forth in claim 30 wherein he vehicle has a fuel line for supplying fuel to the engine and wherein the disabling means includes a valve in the fuel line and means for closing the valve in response to at least one of the HIGH CO signals so that fuel is prevented from flowing through the fuel line to the engine whereby operation of the engine is disabled.

35. The system as set forth in claim 30 wherein the vehicle has windows and means for opening/closing the windows and further comprising means for energizing the opening/closing means to open the windows when the second HIGH CO signal indicates that the detected concentration of CO inside the compartment is equal to or greater than the first predetermined level and that the detected concentration of CO outside tile compartment is less than the second predetermined level.

36. The system as set forth in claim 35 further comprising means for energizing the opening/closing means to close the windows when the first HIGH CO signal indicates that the concentration of CO outside the compartment is greater than the second predetermined level and the concentration of CO inside the compartment is less than the first predetermined level.

37. The system as set forth in claim 36 further comprising means for generating a LOWER WINDOW signal and a RAISE WINDOW signal wherein said means for energizing the opening/closing means to open the windows is responsive to the LOWER WINDOW signal and said means for energizing the opening/closing means to close the windows is responsive to the RAISE WINDOW signal.

38. The system as set forth in claim 37 wherein the vehicle has an ignition switch having an on position and all off position and wherein said means for generating the LOWER WINDOW and RAISE WINDOW signals includes means for resetting when the ignition switch is off whereby said means for energizing the opening/closing means to open the windows and said means for energizing the opening/closing means to close the windows are continually responsive to the LOWER WINDOW and RAISE WINDOW signals, respectively, until said means for generating the LOWER WINDOW and RAISE WINDOW signals is reset.

39. The system as set forth in claim 25 further comprising means for producing an audible warning when the detected concentration of CO is greater than at least one of the predetermined levels.

40. The system as set forth in claim 25 further comprising means for producing a visual warning when the detected concentration of CO is greater than at least one of the predetermined levels.

41. The system as set forth in claim 24 further comprising means for sensing a status condition of the vehicle and means for inhibiting the disabling of the engine when the sensing means senses the status condition.

42. The system as set forth in claim 41 wherein the vehicle has an automatic transmission having a gear shift lever and wherein the sensing means comprises means for determining when the gear shift lever is in park or neutral and wherein the disabling means disables the engine only when the sensed position of the lever is park or neutral.

43. The system as set forth in claim 41 wherein the vehicle has a manual transmission having a gear shift lever having a neutral position and a clutch movable between a depressed position and a nondepressed position and wherein the sensing means comprises means for determining when the gear shift lever is in the neutral position and widen the clutch is in the nondepressed position and wherein the disabling means disables the engine only when the sensed position of the lever is the neutral position and the sensed position of the clutch is the nondepressed position.

44. The system as set forth in claim 41 wherein the sensing means comprises means for sensing vehicle motion and wherein the inhibiting means inhibits the disabling of the engine when the vehicle motion is sensed.

45. The system as set forth in claim 41 wherein the vehicle has an output shaft which moves when the vehicle is in motion and wherein the sensing means comprises means for determining when the output shaft moves and wherein the inhibiting means inhibits the disabling of the engine when motion of the shaft is sensed.

46. The system as set forth in claim 41 wherein the vehicle has means for providing a signal which indicates vehicle speed and wherein the sensing means comprises means for determining when the speed signal indicates that tile vehicle is in motion and wherein the inhibiting means inhibits the disabling of the engine when the detected speed signal indicates the vehicle is in motion.

47. The system as set forth in claim 24 wherein the vehicle has an ignition switch having an off position for disabling the vehicle and an on position for enabling the vehicle and further comprising means for deactivating said system when the ignition switch is in the off position and reactivating said system when the ignition switch is in the on position.

48. The system as set forth in claim 47 wherein the vehicle has an ignition switch having an off position for disabling the vehicle and an on position for enabling the vehicle and further comprising means for resetting said means for disabling the engine when the ignition switch is in the off position.

49. A system for monitoring carbon monoxide (CO) levels produced by a vehicle having an engine and having a passenger compartment, the operation of the engine producing CO as a by-product, said system comprising:

a detector in the passenger compartment for detecting the concentration of CO inside the compartment;

means for generating a HIGH CO signal when the detected concentration of CO inside the vehicle is greater than a predetermined level;

a circuit for disabling the operation of the engine in response to the HIGH CO signal wherein the disabling means disables the operation of the engine only when the detected concentration of CO is greater than the predetermined level for longer than a predetermined length of time and prevents re-enabling of the operation of the engine during periods when the HIGH CO signal is present.

50. A method for monitoring carbon monoxide (CO) levels produced by a vehicle having an engine and having a passenger compartment, the operation of the engine producing CO as a by-product, said method comprising the steps of:
- detecting the concentration of CO inside the passenger compartment;
- generating a HIGH CO signal when the detected concentration of CO inside the compartment is greater than a predetermined level;
- disabling the operation of the engine in response to the HIGH CO signal and preventing re-enabling of the operation of the engine during periods when the HIGH CO signal is present;
- sensing a status condition of the vehicle; and
- inhibiting the disabling of the engine when the status condition is sensed at the sensing step.

* * * * *

UNITED STATES PATENT AND TRADEMARK OFFICE
CERTIFICATE OF CORRECTION

PATENT NO. : 5,333,703

DATED : August 2, 1994

INVENTOR(S) : Robert C. James et al.

It is certified that error appears in the above-identified patent and that said Letters Patent is hereby corrected as shown below:

Column 16, claim 8, line 28, "inhibits tile disabling" should read ---inhibits the disabling---.

Column 16, claim 9, lines 32-33, "wherein tile vehicle" should read ---wherein the vehicle---.

Column 16, claim 11, lines 41-42, "wherein tile vehicle" should read ---wherein the vehicle---.

Column 16, claim 11, line 42, "enabling tile engine" should read ---enabling the engine---.

Column 16, claim 11, line 44, "of tile ignition" should read ---of the ignition---.

Column 16, claim 12, lines 48-49, "fuel to tile engine" should read ---fuel to the engine---.

Column 17, claim 17, line 14, "axial each activating said" should read ---and reactivating said---.

Column 17, claim 18, line 18, "disabling tile vehicle" should read ---disabling the vehicle---.

Column 17, claim 18, line 20, "when tile ignition" should read ---when the ignition---.

Column 17, claim 19, line 25, "when tile detected" should read ---when the detected---.

Column 17, claim 20, line 33, "open tile windows" should read ---open the windows---.

UNITED STATES PATENT AND TRADEMARK OFFICE
CERTIFICATE OF CORRECTION

PATENT NO. : 5,333,703

DATED : August 2, 1994

INVENTOR(S) : Robert C. James et al.

It is certified that error appears in the above-identified patent and that said Letters Patent is hereby corrected as shown below:

Column 17, claim 20, line 35, "inside tile compartment" should read ---inside the compartment---.

Column 17, claim 22, line 50, "open tile windows" should read ---open the windows---.

Column 17, claim 22, line 50, "to tile LOWER" should read ---to the LOWER---.

Column 17, claim 22, line 52, "close tile windows" should read ---close the windows---.

Column 17, claim 22, line 53, "to tile RAISE" should read ---to the RAISE---.

Column 17, claim 23, lines 54-55, "wherein tile vehicle" should read ---wherein the vehicle---.

Column 17, claim 23, line 56, "all Off position" should read ---an off position---.

Column 17, claim 23, lines 56-57, "generating tile LOWER" should read ---generating the LOWER---.

Column 17, claim 23, line 58, "when tile ignition" should read ---when the ignition---.

Column 18, claim 29, line 46, "switch ]laving" should read ---switch having---.

Column 18, claim 29, line 49, "when tile ignition" should read ---when the ignition---.

UNITED STATES PATENT AND TRADEMARK OFFICE
CERTIFICATE OF CORRECTION

PATENT NO. : 5,333,703

DATED : August 2, 1994

INVENTOR(S) : Robert C. James et al.

It is certified that error appears in the above-identified patent and that said Letters Patent is hereby corrected as shown below:

Column 18, claim 30, lines 52-53, "outside tile compartment" should read ---outside the compartment---.

Column 18, claim 31, lines 58-59, "wherein tile vehicle" should read ---wherein the vehicle---.

Column 19, claim 32, line 2, "of tile engine" should read ---of the engine---.

Column 19, claim 33, line 5, "to tile engine" should read ---to the engine---.

Column 19, claim 33, line 6, "of tile fuel" should read ---of the fuel---.

Column 19, claim 34, lines 11-12, "wherein he vehicle" should read ---wherein the vehicle---.

Column 19, claim 35, lines 25-26, "outside tile compartment" should read ---outside the compartment---.

Column 19, claim 38, lines 43-44, "and all off position" should read ---and an off position---.

Column 20, claim 43, line 12, "and widen the clutch" should read ---when the clutch---.

Column 20, claim 46, line 32, "that tile vehicle" should read ---that the vehicle---.

UNITED STATES PATENT AND TRADEMARK OFFICE
CERTIFICATE OF CORRECTION

PATENT NO. : 5,333,703
DATED : August 2, 1994
INVENTOR(S) : Robert C. James, et al.

It is certified that error appears in the above-indentified patent and that said Letters Patent is hereby corrected as shown below:

Column 20, claim 46, line 32, "that tile vehicle" should read --that the vehicle--.

Signed and Sealed this

Twenty-fourth Day of January, 1995

Attest:

BRUCE LEHMAN

Attesting Officer

Commissioner of Patents and Trademarks